(12) United States Patent
Lee

(10) Patent No.: US 8,629,766 B2
(45) Date of Patent: Jan. 14, 2014

(54) PORTABLE INFORMATION DISPLAY APPARATUS

(76) Inventor: Myung Su Lee, Seoul (KR)

( * ) Notice: Subject to any disclaimer, the term of this patent is extended or adjusted under 35 U.S.C. 154(b) by 84 days.

(21) Appl. No.: 13/503,024

(22) PCT Filed: Dec. 23, 2010

(86) PCT No.: PCT/KR2010/009269
§ 371 (c)(1),
(2), (4) Date: Apr. 19, 2012

(87) PCT Pub. No.: WO2011/081356
PCT Pub. Date: Jul. 7, 2011

(65) Prior Publication Data
US 2012/0206249 A1 Aug. 16, 2012

(30) Foreign Application Priority Data

Dec. 30, 2009 (KR) .................. 10-2009-0133712
May 31, 2010 (KR) .................. 10-2010-0050992

(51) Int. Cl.
*B62J 3/00* (2006.01)
*B62J 6/00* (2006.01)

(52) U.S. Cl.
USPC ........ 340/432; 340/425.5; 340/468; 340/463; 340/471; 340/473; 340/475

(58) Field of Classification Search
USPC .............. 340/425.5, 468, 463, 464, 465, 467, 340/471, 473, 475, 479
See application file for complete search history.

(56) References Cited

U.S. PATENT DOCUMENTS

| 8,009,031 | B2 * | 8/2011 | Pacheco et al. | 340/479 |
| 8,179,246 | B2 * | 5/2012 | Lee et al. | 340/463 |
| 8,269,619 | B2 * | 9/2012 | Lee | 340/475 |
| 2007/0063831 | A1 * | 3/2007 | Perkins et al. | 340/479 |
| 2008/0088423 | A1 * | 4/2008 | Liu | 340/432 |

FOREIGN PATENT DOCUMENTS

| JP | 2001-270483 A | 10/2001 |
| JP | 2002-059781 A | 2/2002 |
| KR | 10-2006-0026537 A | 3/2006 |
| KR | 10-0910402 B1 | 8/2009 |

OTHER PUBLICATIONS

International Search Report for PCT/KR2010/009269, Sep. 1, 2011.
English translation of Abstract of JP 2001-270483, Oct. 2, 2001.
English translation of Abstract of KR 10-0910402, Aug. 4, 2009.
English translation of KR 10-2006-0026537, Mar. 24, 2006 .
English translation of JP 2002-059781, Feb. 26, 2002.

* cited by examiner

*Primary Examiner* — Travis Hunnings
(74) *Attorney, Agent, or Firm* — The PL Law Group, PLLC

(57) ABSTRACT

The present invention relates to an indicating display device which can be simply carried or worn. The indicating display device of the present invention comprises: a first display unit; a first transceiving unit for transceiving signals; a first sensor for sensing a motion; a first control unit for controlling the first transceiving unit, and controlling the first display unit in accordance with the signal received at the first transceiving unit or information sensed by the first sensor, such that the first display unit displays various states; a second display unit; a second transceiving unit for transceiving signals; a mode selection unit for selecting a mode; and a second control unit for controlling the second display unit and the second transceiving unit in the mode selected by the mode selection unit.

19 Claims, 16 Drawing Sheets

PORTABLE INFORMATION DISPLAY APPARATUS

CROSS-REFERENCES TO RELATED APPLICATIONS

The present application claims priority to International Application PCT/KR2010/009269, with an International Filing Date of Dec. 23, 2010, which claims the benefit of Korean Patent Application No. 10-2009-0133712 filed in the Korean Intellectual Property Office on Dec. 30, 2009 and Korean Patent Application No. 10-2010-0050992 filed in the Korean Intellectual Property Office on May 31, 2010, the entire contents of which are incorporated herein by reference,

FIELD OF THE INVENTION

The present invention relates to a portable information display apparatus and, more particularly, to a portable information display apparatus which can be simply carried and worn and is able to display emoticons, text, or symbols during bicycle riding or leisure sports.

DESCRIPTION OF THE RELATED ART

An eco-friendly and economical bicycle is recently being used as public transportation means.

The bicycle has been in the spotlight not only as transportation means, but also as rides or leisure sports, and a demand for the bicycle is further increasing from a viewpoint of energy saving in line with the era of the high oil prices.

However, the bicycle has to be ridden in various environments, such as the edges of roads where vehicles are run, bike-only roads, and roads neighboring pedestrian passages for pedestrians. Accordingly, when riding a bicycle, special attention must be paid in environments where a field of vision is not sufficiently secured, such as night.

Unlike in a vehicle, a rider who rides a bicycle cannot sufficiently transfer information about his state or riding direction to other adjacent riders or vehicles. Accordingly, the riding direction or state of a bicycle being driven ahead of another bicycle or a vehicle that is approaching the bicycle being driven from the back cannot be expected, with the result that frequent accidents occur.

Furthermore, when enjoying leisure sports, such as tracking or mountain climbing, it is necessary to inform adjacent people of his situation or information. In particular, the need for such information is pressing in emergency situations.

Accordingly, there is a need for an apparatus capable of visually providing information to other adjacent people or vehicles in various situations, such as bicycle riding.

SUMMARY

Accordingly, the present invention has been made in view of the above problems occurring in the prior art, and it is an object of the present invention to provide a portable information display apparatus capable of displaying various pieces of information, such as emoticons, text, or riding directions, in the state in which the apparatus is carried.

A portable information display apparatus according to the present invention comprises an indicating display device, comprising a first display unit capable of displaying one or more of emoticons, text, and symbols, a first sensor including a tilt sensor, a first transceiver unit for wireless communication, and a first control unit configured to receive a mode signal through the first transceiver unit, to have critical values for performing an automatic mode set therein, and to control the selective display of the emoticons, the text, and the symbols in the first display unit, the indicating display device being mounted on a product that is wearable by a user; and a remocon, comprising a second transceiver unit for the wireless communication, a mode selection unit capable of selecting the automatic mode, and a second control unit for controlling the mode signal provided when the mode selection unit selects the automatic mode so that the mode signal is transmitted to the first transceiver unit through the second transceiver unit, wherein when the mode signal corresponding to the automatic mode is transmitted from the remocon to the indicating display device, the first control unit compares the sensing signal of the first sensor, obtained by sensing a tilt according to a motion of a user, with the critical values and performs the selective display of the emoticons, the text, and the symbols according to a result of the comparison.

Here, it is preferred that the first control unit perform the selective display of the emoticons, the text, and the symbols for a during-riding, a stop, a left direction, and a right direction in response to the sensing signal of the first sensor.

Furthermore, it is preferred that the first control unit compare a sensing signal according to the degree that the first sensor is inclined forward or inclined left or right with the critical values and perform the selective display of the emoticons, the text, and the symbols for a during-riding, a stop, a left direction, and a right direction.

Furthermore, a portable information display apparatus according to the present invention comprises an indicating display device, comprising a first display unit capable of displaying one or more of emoticons, text, and symbols, a first sensor including a tilt sensor, a first transceiver unit for wireless communication, and a first control unit for receiving a mode signal through the first transceiver unit and for controlling the selective display of the emoticons, the text, and the symbols in the first display unit in response to an emotion mode, the indicating display device being mounted on a product that is wearable by a user, wherein the first control unit controls the emoticons, the text, and the symbols such that the emoticons, the text, and the symbols are selectively displayed in the first display unit in response to the sensing signal of the first sensor according to a motion of a user in the emotion mode set by the mode signal.

Furthermore, a portable information display apparatus according to the present invention comprises an indicating display device, comprising a first display unit capable of displaying one or more of emoticons, text, and symbols, a first transceiver unit for wireless communication, and a first control unit for receiving a mode signal through the first transceiver unit and for controlling the selective display of the emoticons, the text, and the symbols in the first display unit in response to a sensing mode, the indicating display device being mounted on a product that is wearable by a user; and a remocon, comprising a second display unit for displaying a manipulation state, a second transceiver unit for the wireless communication, a mode selection unit capable of selecting the sensing mode, a second sensor for sensing the hand movement of a user, and a second control unit for transmitting the mode signal of the mode selection unit and a control signal corresponding to the sensing signal of the second sensor to the first transceiver unit through the second transceiver unit and for controlling a display state of the second display unit in response to the sensing signal, wherein when the mode signal corresponding to the sensing mode is transmitted from the remocon to the indicating display device, the first control unit performs the selective display of the emoticons, the text, and the symbols corresponding to the hand movement of the user.

Here, the second sensor may sense the action of the hand corresponding to a stop display indicating the stop state of the hand, a right direction arrow indicating the hand movement from the left to the right, or a left direction arrow indicating the hand movement from the right to the left and provide the sensing signal corresponding to the sensed action, and the first and the second display units may be controlled for the selective display corresponding to the provided signal.

Furthermore, a portable information display apparatus according to the present invention comprises an indicating display device, comprising a first display unit capable of displaying one or more of emoticons, text, and symbols, a first transceiver unit for wireless communication, and a first control unit for receiving a mode signal through the first transceiver unit and for controlling the selective display of the emoticons, the text, and the symbols in the first display unit in response to a manual mode, the indicating display device being mounted on a product that is wearable by a user; and a remocon, comprising a second display unit for displaying a manipulation state, a second transceiver unit for the wireless communication, a mode selection unit capable of selecting the manual mode according to the manipulation of a user, a direction indication unit manipulated by the user, and a second control unit for transmitting the mode signal of the mode selection unit and the control signal of the direction indication unit to the first transceiver unit through the second transceiver unit and for controlling the display state of the second display unit, wherein when the mode signal corresponding to the manual mode is transmitted from the remocon to the indicating display device, the first control unit performs the selective display of the emoticons, the text, and the symbols corresponding to the control signal of the direction indication unit.

Furthermore, the direction indication unit may provide the control signal corresponding to a stop, a left direction, or a right direction, and the first and the second display units may be controlled for the selective display corresponding to the provided signal.

Furthermore, the remocon may further comprise an emergency light button, and the second display unit may be controlled for the display of an emergency signal according to the manipulation of the emergency light button.

Furthermore, a portable information display apparatus according to the present invention comprises an indicating display device, comprising a first display unit capable of displaying one or more of emoticons, text, and symbols, a first transceiver unit for wireless communication, and a first control unit for receiving a mode signal through the first transceiver unit and for controlling the selective display of the emoticons, the text, and the symbols in the first display unit in response to an emotion mode, the indicating display device being mounted on a product that is wearable by a user; and a remocon, comprising a second display unit for displaying selected emoticons, text, or symbols, a second transceiver unit for the wireless communication, a mode selection unit capable of selecting the emotion mode according to the manipulation of a user, a button for enabling the user to select emotion, and a second control unit for transmitting the mode signal of the mode selection unit and the control signal of the button to the first transceiver unit through the second transceiver unit and for controlling a display state of the second display unit, wherein when the mode signal corresponding to the emotion mode is transmitted from the remocon to the indicating display device, the first control unit performs the selective display of the emoticons, the text, and the symbols corresponding to the control signal of the direction indication unit.

Here, the indicating display device may perform the display, including the emotions including a smile display, a wink display, and a display indicating that both eyes are shut, and text including a help display in response to the control signal of the button.

Furthermore, a portable information display apparatus according to the present invention comprises a remocon configured to comprise a second display unit for displaying emoticons, text, or symbols, a second transceiver unit for wireless communication, and a second control unit for performing control so that the mobile phone number of a counterpart received through the second transceiver unit is displayed in the second display unit; and a mobile phone configured to perform wireless communication with the second transceiver unit and to transmit the mobile phone number of the counterpart.

Furthermore, a portable information display apparatus according to the present invention comprises a remocon, comprising a power button for selecting the supply of power when the power button is pressed and for selecting a right turn and a left turn when the power button is moved up and down, a direction mark unit for emitting light in response to the right turn and the left turn, a stop mark unit for selecting a stop display when the stop mark unit is pressed, a transceiver unit for wirelessly transmitting and receiving signals according to the operations of the power button and the stop mark unit, and a first processing unit for controlling the transceiver unit when an automatic mode or a manual mode is set according to the manipulation of the power button; and an indicating display device, comprising a light-emitting unit formed of a plurality of light-emitting diodes and formed to have a doughnut shape and a second processing unit formed in the central region of the light-emitting unit and configured to control the emission of the light-emitting unit through wireless transmission and reception to and from the remocon, wherein the indicating display device is mounted on any one of a portable backpack and a band that is worn.

Here, the light-emitting unit may comprise the plurality of light-emitting diodes, forming a circle, a diamond shape formed within the circle, and a column crossing the circle and the diamond shape, and the plurality of light-emitting diodes may individually emit light in response to a during-riding, a stop, a left turn, and a right turn.

Furthermore, when the indicating display device is set in the manual mode, the power button is movable upwardly and downwardly in order to display a right turn and a left turn, and the second processing unit may turn on the light-emitting unit according to the movement state of the power source from the remocon.

Furthermore, the indicating display device may further comprise a tilt sensor for an automatic mode, wherein the second processing unit turns on the light-emitting unit by determining a right turn, a left turn, a stop, and a during-riding according to the sensing of the tilt sensor.

Furthermore, a portable information display apparatus according to the present invention comprises a mobile terminal configured to have an application program for generating emoticons, text, and symbols or externally downloading the emoticons, text, and symbols and storing the generated or downloaded emoticons, text, and symbols or wirelessly transmitting the stored emoticons, text, and symbols installed therein and to have a wireless communication function for the wireless transmission; a remocon configured to comprise a first display unit capable of displaying at least one of the emoticons, the text, and the symbols and to display the emoticons, the text, and the symbols, received from the mobile terminal, in a plurality of modes that can be set; and an indicating display device configured to comprise a second display unit capable of displaying at least one of the emoticons, the text, and the symbols and to display the emoticons, the text, and the symbols, received from the mobile terminal, in a plurality of modes that can be set, and mounted on a product that is wearable by a user.

Here, an acceleration sensor for displaying information, indicating a moving speed, in a form of the emoticons, the text, and the symbols according to the moving speed may be embedded in the indicating display device.

DETAILED DESCRIPTION OF EXEMPLARY EMBODIMENTS

A first embodiment of the present invention is described below with reference to FIGS. 1 to 21.

In the present invention, a "motion state" means the state of a behavior of a person or an object. For example, the motion state may mean 'during-riding' when a person rides on a bicycle or when a person riding on a bicycle drives the bicycle, the motion state may mean 'a stop' when a bicycle is stopped, the motion state may mean 'the left' when the handle of a bicycle is driven to the left, and the motion state may mean 'the right' when the handle of a bicycle is driven to the right.

Furthermore, it is to be noted that the portable information display apparatus according to the present invention is applicable to both the cases where a remote controller (hereinafter referred to as a 'remocon') is included and where the remocon is not included.

Figure 1:
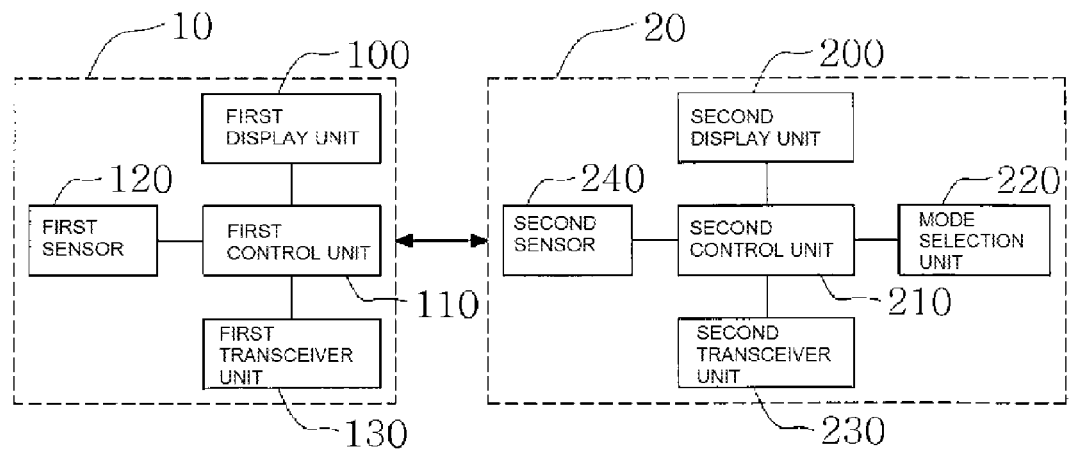
FIG. 1 is a block diagram according to a first embodiment of the present invention.

Referring to FIG. 1, the portable information display apparatus according to the present invention includes an indicating display device 10 and a remocon 20. The indicating display device 10 includes a first display unit 100, a first control unit 110, a first sensor 120, and a first transceiver unit 130. The remocon 20 includes a second display unit 200, a second control unit 210, a mode selection unit 220, and a second transceiver unit 230. The remocon 20 according to the present invention may further include a second sensor 240. The remocon 20 according to the present invention may further include a direction indication unit 250. The remocon 20 according to the present invention may further include an emergency light button 260.

The indicating display device 10 may be mounted on a product (i.e., a bag or the band) that may be worn while a user rides on a bicycle riding performs leisure sports.

The first display unit 100 of the indicating display device 10 may be implemented by using a plurality of light-emitting diodes formed in a printed circuit board or using any one of a plurality of light-emitting diodes, conductive yarns, and a combination of fibers. Here, the first display unit 100 displays various emoticons in order to represent the riding, behavior, stop, left and right of a direction, and emotion of a person or an object such that the various emoticons are visually seen externally.

The first sensor 120 senses the motion of a person or object. For example, the first sensor 120 may include one or more of a behavior sensor for sensing the behavior of an object, a tilt sensor for sensing the tilt of an object, and a speed sensor for sensing the speed of an object.

The first transceiver unit 130 communicates with other external terminals (e.g., a remocon or a mobile phone to be described later) by performing wireless transmission and reception and may use ZigBee, Bluetooth, etc. as a communication protocol.

The first control unit 110 controls the first display unit 100, the first transceiver unit 130, and the first sensor 120. For example, the first control unit 110 may perform control such that information (e.g., an angle tilted on the basis of a vertical plane or an angle tilted on the basis of a horizontal plane) sensed by the first sensor 120 is compared with a critical value (e.g., a tilted angle of 30 degrees) preset by the user or a designer and riding, a stop, a left direction, and a right direction are displayed in the first display unit 100. Other detailed descriptions are given below with reference to the drawings.

The second control unit 210 of the remocon 20 controls the second display unit 200, the second transceiver unit 230, and the second sensor 240.

The second display unit 200 displays various emoticons in order to represent the riding, behavior, stop, the left and right of a direction, emotion, etc. of a person or object such that the various emoticons are visually seen externally. For example, the second display unit 200 may be an LCD panel, an LED panel, or the like.

The second transceiver unit 230 transmits signals and/or data that will be displayed in the first display unit 100 to the first transceiver unit 130 under the control of the second control unit 210 by performing wireless transmission and reception. To this end, the second transceiver unit 230 may use ZigBee communication or Bluetooth as a protocol.

The second transceiver unit 230 may also communicate with external terminals. For example, when a call is received by a mobile phone, the second transceiver unit 230 may receive the number of a counterpart's mobile phone from the mobile phone through wireless communication. The second control unit 210 may perform control such that the number of the counterpart's mobile phone received by the second transceiver unit 230 is displayed in the second display unit 200, and an example thereof is described in detail below with reference to FIG. 21.

The mode selection unit 220 may select one or more of the modes of the indicating display device 10 and provide mode signals according to the selected modes. Here, the modes of the indicating display device 10 may include various modes, such as a riding mode, an emotion mode, an automatic mode, a manual mode, and a sensing mode. For example, the modes may be selected in various ways, such as the automatic mode in the riding mode, the manual mode in the riding mode, the automatic mode in the emotion mode, and the manual mode or the sensing mode in the emotion mode.

Information (i.e., a mode signal) about a mode selected in the mode selection unit 220 may be transmitted to the indicating display device 10 through the second transceiver unit 230. In response to the mode signal, the indicating display device 10 may be synchronized with the manipulation of the remocon 20 by a user and thus operated.

The second sensor 240 may be formed of a proximity sensor and configured to sense the hand motion of a user. For example, when a user places his hand on the remocon 20 for a specific period of time, the second sensor 240 senses the hand motion. In response to the sensing signal of the second sensor 240, the second control unit 210 may perform control such that the second display unit 200 displays a stop. Furthermore, when a user moves his hand from the left to the right, the second control unit 210 may perform control such that the second display unit 200 displays a left direction arrow in response to the sensing signal of the second sensor 240 that has sensed the motion of the hand. Furthermore, when a user moves his hand from the right to the left, the second control unit 210 may perform control such that the second display unit 200 displays a right direction arrow in response to the sensing signal of the second sensor 240 that has sensed the motion of the hand. Examples of the motion of the hand are described in detail below with reference to FIGS. 18 to 20.

Furthermore, the second control unit 210 may transmit information, now being displayed by itself, to the indicating display device 10 through the second transceiver unit 230. The first transmission unit 130 of the indicating display device 10 may receive information transmitted by the remocon 20 and transfer the information to the first control unit 110. The first control unit 110 may perform control such that the same information as that displayed in the remocon 20 is displayed in the first display unit 100.

Figure 2:
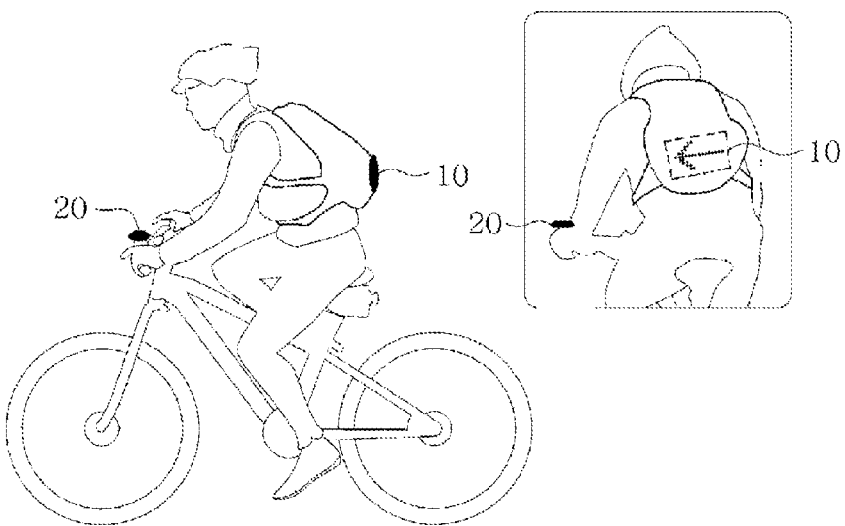
FIG. 2 shows a use state according to the first embodiment of the present invention.

FIG. 2 is a diagram showing a use state according to the first embodiment of the present invention.

Referring to FIG. 2, the indicating display device 10 of the present invention may be mounted on a backpack, and the remocon 20 may be mounted on a bicycle handle. Here, if the remocon 20 can be separated from a bicycle handle and a user gets off the bicycle and walks, the remocon may be separated from the bicycle handle. Furthermore, the indicating display device 10 may be formed not only in a backpack, but also the band that may be worn by a user. Here, the band may correspond to the band of a cross type that is described with reference to FIGS. 32 and 34.

Examples of operations in various modes that may be implemented in the present invention are described with reference to the drawings. It is assumed that a user carries a backpack to which the indicating display device 10 is attached and rides on a bicycle to which the remocon 20 is attached. It is also noted that reference is made to FIGS. 1 and 2.

FIGS. 3 to 7 are diagrams illustrating the operation of the manual mode in the riding mode according to the first embodiment of the present invention.

Figure 3:
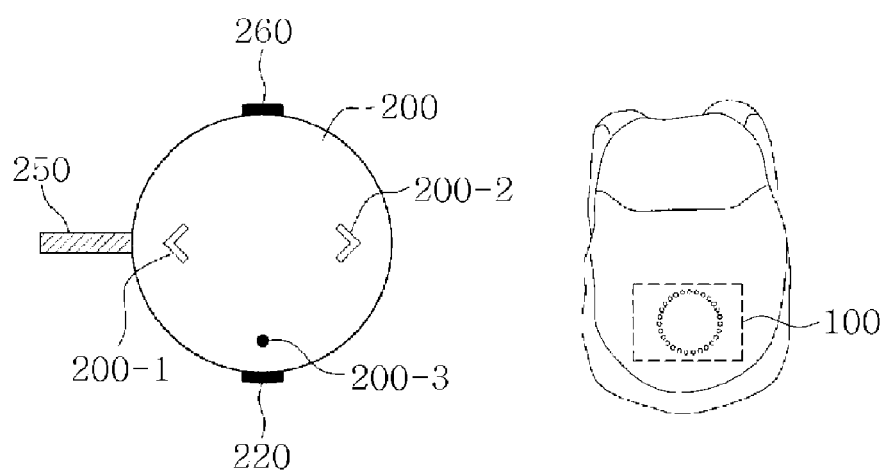
FIGS. 3 to 7 are operational diagrams showing the operations of a manual mode in a riding mode according to the first embodiment of the present invention.

Referring to FIG. 3, when a user turns on power using the power button (not shown) of the remocon 20, the power display unit 200-3 of the remocon 20 is turned on. The user sets the manual mode in the riding mode by using the mode selection unit 220. At this time, information about the mode setting state is transmitted from the remocon 20 to the indicating display device 10.

Accordingly, when the user sets the manual mode in the riding mode using the remocon 20 and rides on a bicycle, the left direction display lamp 200-1 and the right direction display lamp 200-2 of the second display unit 200 are not turned on. At this time, the first control unit 110 of the indicating display device 10 mounted on a backpack performs control such that the first display unit 100 displays a circle. That is, the first control unit 110 controls light-emitting diodes formed as the first display unit 100 such that the first display unit 100 displays the circle.

Figure 4:
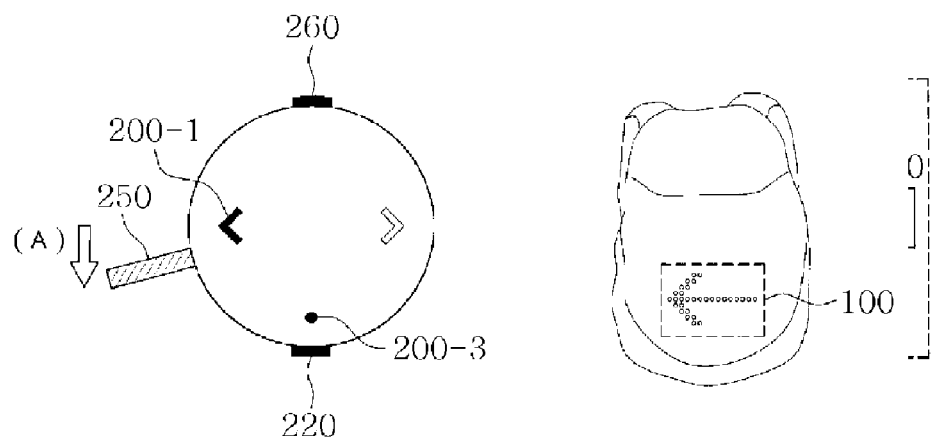

FIG. 4 is a diagram illustrating the operation of the manual mode in the riding mode according to the first embodiment of the present invention when a user tries to move to the left and externally inform the left movement.

Referring to FIG. 4, when the user lowers the direction indication unit 250 of the remocon 20 in a direction (A) (i.e., a downward direction in the drawing), the left direction display lamp 200-1 is turned on. At this time, a signal corresponding to the manipulation of the direction indication unit 250 is transmitted from the remocon 20 to the indicating display device 10, and the first control unit 110 of the indicating display device 10 attached to the backpack performs control such that the first display unit 100 displays a left direction arrow. That is, the first control unit 110 controls the light-emitting diodes formed as the first display unit 100 such that the first display unit 100 displays the left direction arrow. Furthermore, various settings, such as that the left direction display lamp 200-1 flickers or the left direction arrow of the first display unit 100 flickers, are possible according to the setting of the remocon 20 and the indicating display device 10.

Figure 5:
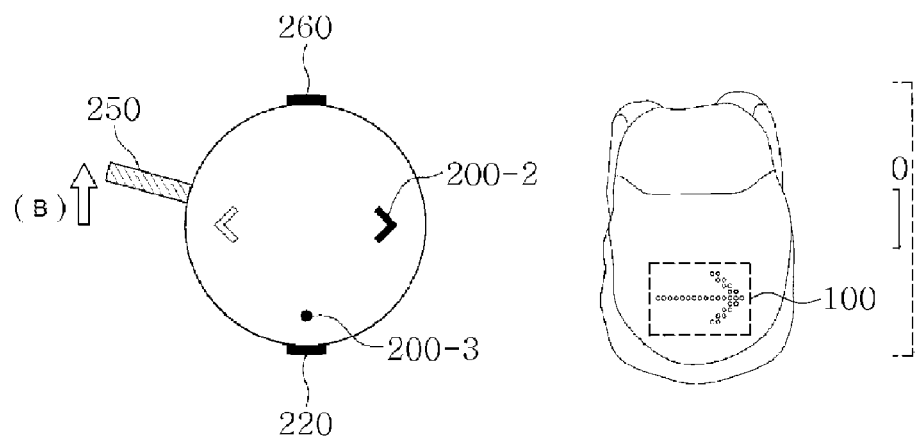

FIG. 5 is a diagram illustrating the operation of the manual mode in the riding mode according to the first embodiment of the present invention when a user tries to move to the right and externally inform the right movement.

Referring to FIG. 5, when the user raises the direction indication unit 250 of the remocon 20 in a direction (B) (i.e., an upward direction in the drawing), the right direction display lamp 200-2 is turned on. At this time, a signal corresponding to the manipulation of the direction indication unit 250 is transmitted from the remocon 20 to the indicating display device 10, and the first control unit 110 of the indicating display device 10 attached to a backpack controls the first display unit 100 such that the first display unit 100 displays a right direction arrow. That is, the first control unit 110 controls the light-emitting diodes formed as the first display unit 100 such that the first display unit 100 displays the right direction arrow. Furthermore, various settings, such as that the right direction display lamp 200-1 flickers or the right direction arrow of the first display unit 100 flickers, are possible according to the setting of the remocon 20 and the indicating display device 10.

Figure 6:
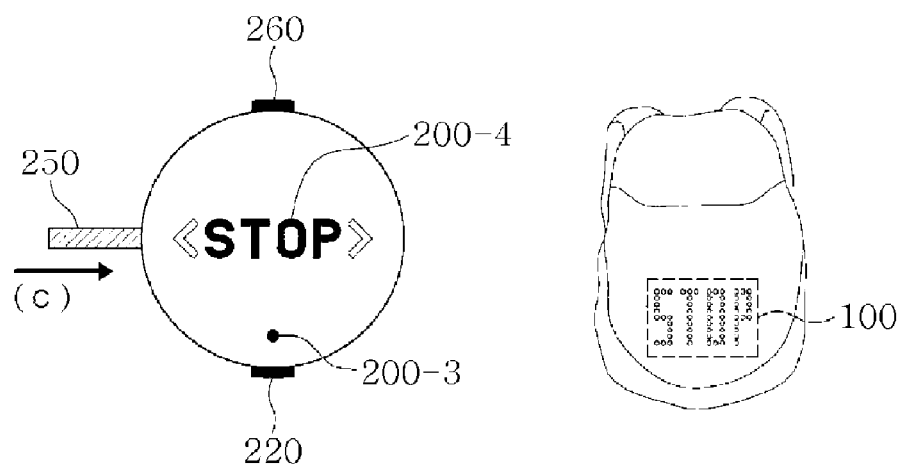

FIG. 6 is a diagram illustrating the operation of the manual mode in the riding mode according to the first embodiment of the present invention when a user tries to stop and externally inform the stop.

Referring to FIG. 6, when a user presses the direction indication unit 250 in a direction (C) (i.e., from a left direction to a right direction in the drawing), a stop display lamp 200-4 is turned on. At this time, a signal corresponding to the manipulation of the direction indication unit 250 is transmitted from the remocon 20 to the indicating display device 10, and the first control unit 110 of the indicating display device 10 attached to a backpack controls the first display unit 100 such that the first display unit 100 displays STOP. That is, the first control unit 110 controls the light-emitting diodes formed as the first display unit 100 such that the first display unit 100 displays STOP. Furthermore, various settings, such as that the stop display lamp 200-4 flickers or the STOP display of the first display unit 100 flickers, are possible according to the setting of the remocon 20 and the indicating display device 10.

Here, an example in which, when the front of the second display unit 200 of the remocon 20 is pressed, the stop display lamp 200-4 is turned on and the first display unit 100 displays STOP is also possible.

Figure 7:
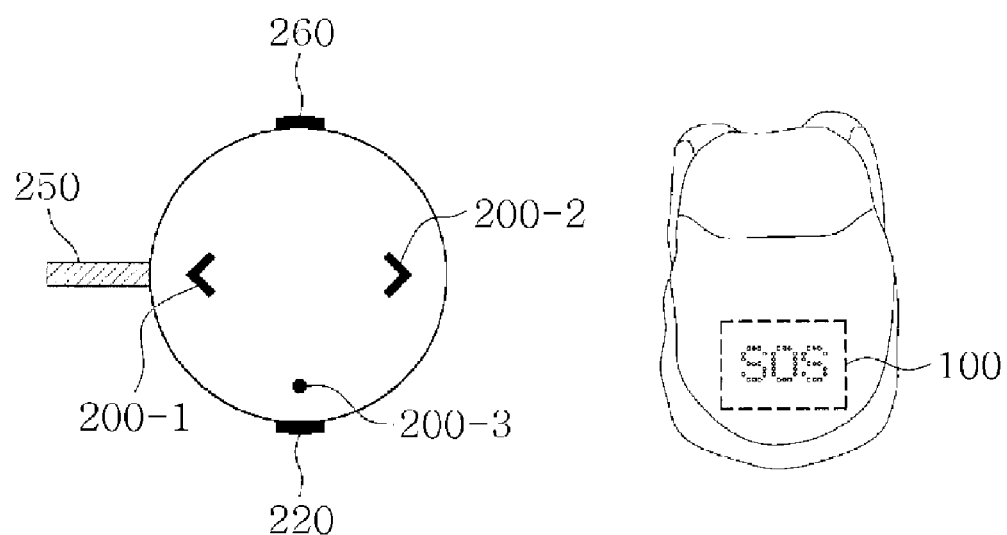

FIG. 7 is a diagram illustrating the operation of the manual mode in the riding mode according to the first embodiment of the present invention when a user tries to inform an emergency situation externally.

Referring to FIG. 7, when the user presses the emergency light button 260, the left direction display lamp 200-1 and the right direction display lamp 200-2 are turned on. At this time, a signal corresponding to the manipulation of the emergency light button 260 is transmitted from the remocon 20 to the indicating display device 10, and the first control unit 110 of the indicating display device 10 attached to a backpack controls the first display unit 100 such that the first display unit 100 displays an emergency signal SOS. That is, the first control unit 110 controls the light-emitting diodes formed as the first display unit 100 such that the first display unit 100 displays the emergency signal SOS. Furthermore, various settings, such as that the left direction display lamp 200-1 and the right direction display lamp 200-2 flickers or the emergency signal SOS of the first display unit 100 flickers, are possible according to the setting of the remocon 20 and the indicating display device 10.

FIGS. 8 to 11 are diagrams showing the operations of the automatic mode in the riding mode according to the first embodiment of the present invention. It is hereinafter assumed that the first sensor 120 of the indicating display device 10 is a tilt sensor. A tilt has the same angle that a rider inclines forward. Here, critical values for a during-riding, a stop, a left direction display, and a right direction display may be set to 10 degrees, 20 degrees, 30 degrees, and 40 degrees, respectively. For example, the stop may be performed when the tilt is less than 10 degrees, the during-riding may be performed when the tilt is between 10 degrees and 20 degrees, the left direction display may be performed when the tilt is between 20 degrees and 30 degrees, and the right direction display may be performed when the tilt is between 30 degrees and 40 degrees. It is to be noted that a user and/or a designer may set the critical values of the tilt in various ways such that sensing is possible in various cases as described above.

Figure 8:
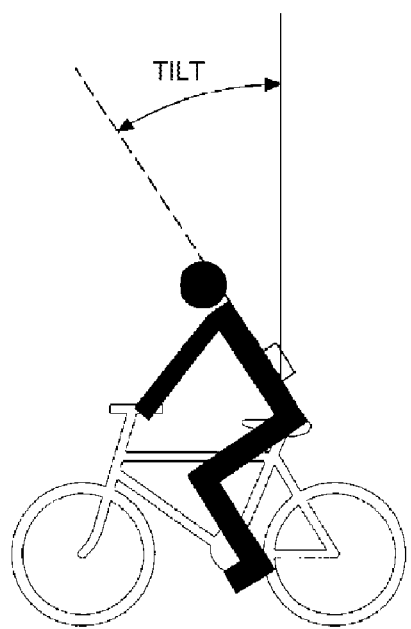
FIGS. 8 to 11 are operational diagrams showing the operations of an automatic mode in the riding mode according to the first embodiment of the present invention.

Referring to FIG. 8, when a user rides on a bicycle and bends himself forward in order to go forward, the first sensor 120 senses a tilt that the user bends himself and informs the first control unit 110 of the sensed tilt. The first control unit 110 compares a critical value, preset by the user or a designer, with the tilt sensed by the first sensor 120. If, as a result of the comparison, the tilt falls within a range of the critical value corresponding to the during-riding, the second display unit 200 of the remocon 20 and the first display unit 100 of the indicating display device 10 perform a display corresponding to the during-riding. For example, a display, such as that shown in FIG. 25 to be described later, is possible, and a detailed description thereof is omitted.

Figure 9:
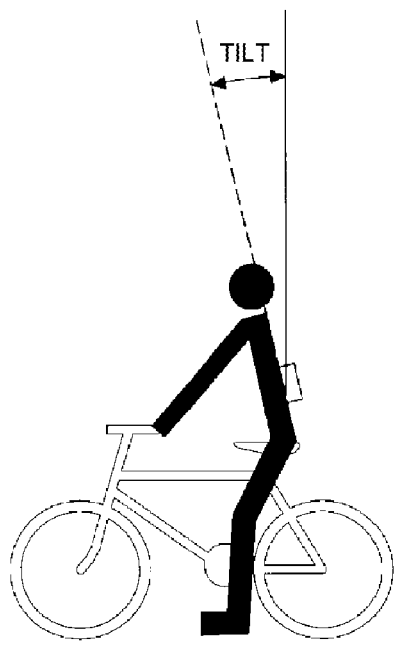

Referring to FIG. 9, when a user stops a bicycle and stretches his back, the first sensor 120 senses a tilt that the user bends himself forward and informs the first control unit 110 of the sensed tilt. The first control unit 110 compares a critical value, set by a user or a designer, with the tilt sensed by the first sensor 120. If, as a result of the comparison, the tilt falls within a range of the critical value corresponding to the stop, the second display unit 200 of the remocon 20 and the first display unit 100 of the indicating display device 10 perform a display corresponding to the stop. For example, a display, such as that shown in FIG. 28 to be described later, is possible, and a detailed description thereof is omitted.

Figure 10:
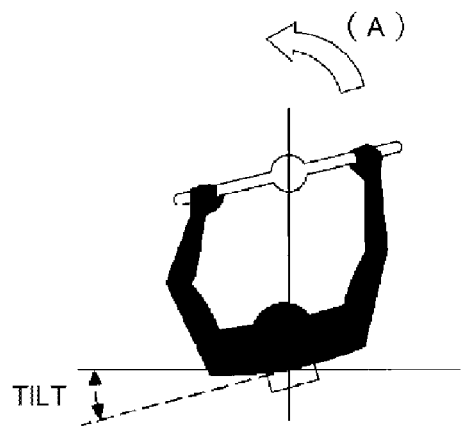

Referring to FIG. 10, when a user rides on a bicycle and moves the handle to a direction (A) (i.e., a left direction) in order to move to the left, the first sensor 120 senses the tilt and informs the first control unit 110 of the sensed tilt. The first control unit 110 compares a critical value, preset by the user or a designer, with the tilt sensed by the first sensor 120. If, as a result of the comparison, the tilt falls within a range of the critical value corresponding to a left turn, the second display unit 200 of the remocon 20 and the first display unit 100 of the indicating display device 10 perform a display corresponding to the left direction arrow. For example, a display, such as that shown in FIG. 26 to be described later, is possible, and a detailed description thereof is omitted.

Figure 11:
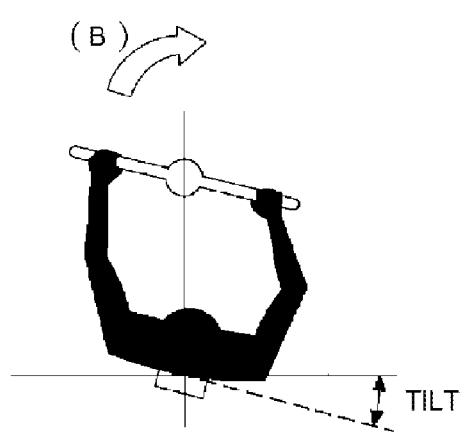

Referring to FIG. 11, when a user rides on a bicycle and moves the handle to a direction (B) (i.e., a right direction) in order to move to the right, the first sensor 120 senses the tilt and informs the first control unit 110 of the sensed tilt. The first control unit 110 compares a critical value, preset by the user or a designer, with the tilt sensed by the first sensor 120. If, as a result of the comparison, the tilt falls within a range of the critical value corresponding to a right turn, the second display unit 200 of the remocon 20 and the first display unit 100 of the indicating display device 10 perform a display corresponding to the right direction arrow. For example, a display, such as that shown in FIG. 27 to be described later, is possible, and a detailed description thereof is omitted.

Figure 12:
FIG. 12 is an operational diagram showing the operation of the automatic mode in an emotion mode according to the first embodiment of the present invention.

FIG. 12 is a diagram illustrating the operation of the automatic mode in the emotion mode according to the first embodiment of the present invention. Here, an example in which the remocon 20 is not operated and only the indicating display device 10 is operated is described below.

The first control unit 110 of the indicating display device 10 may compare information, sensed by the first sensor 120, with preset information and perform control such that various emoticons are displayed in the first display unit 100 based on the preset information. Here, the preset information corresponds to a shape that is set for every action and displayed in the first display unit 100 of the indicating display device 10. A different emoticon is displayed depending on each action. Here, the action may be sensed by the first sensor 120 including a behavior sensor, and the first sensor 120 has a function of providing the first control unit 110 with a signal corresponding to a sensed action. Accordingly, the indicating display device 10 according to the present invention may have an entertainment effect.

FIGS. 13 to 17 are diagrams illustrating the operations of the manual mode in the emotion mode according to the first embodiment of the present invention. Here, the remocon operations of FIGS. 13 to 17 are performed as shown in FIGS. 3 to 7, and a detailed description thereof is omitted. However, displays in the first display unit 100 may include various emoticons, text, or symbols.

Figure 13:
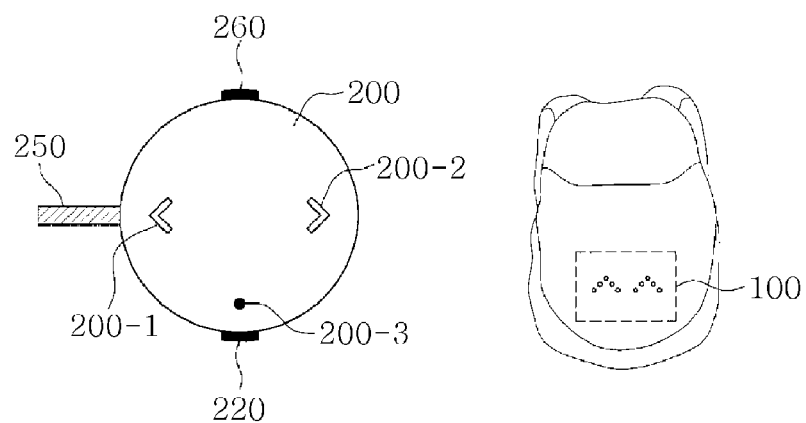
FIGS. 13 to 17 are operational diagrams showing the operations of the manual mode in the emotion mode according to the first embodiment of the present invention.
Figure 14:
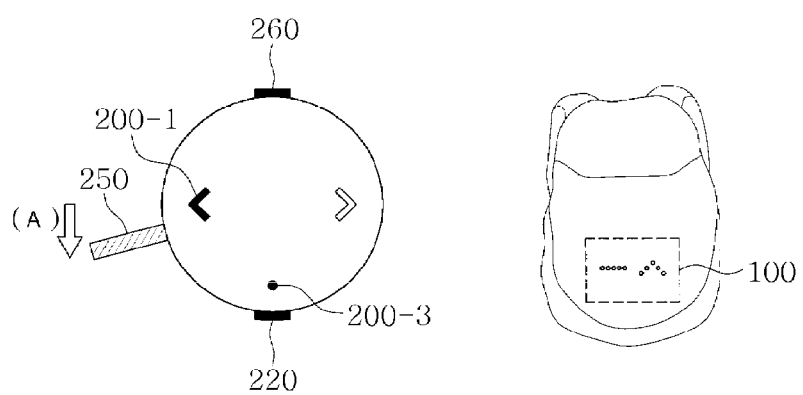
Figure 15:
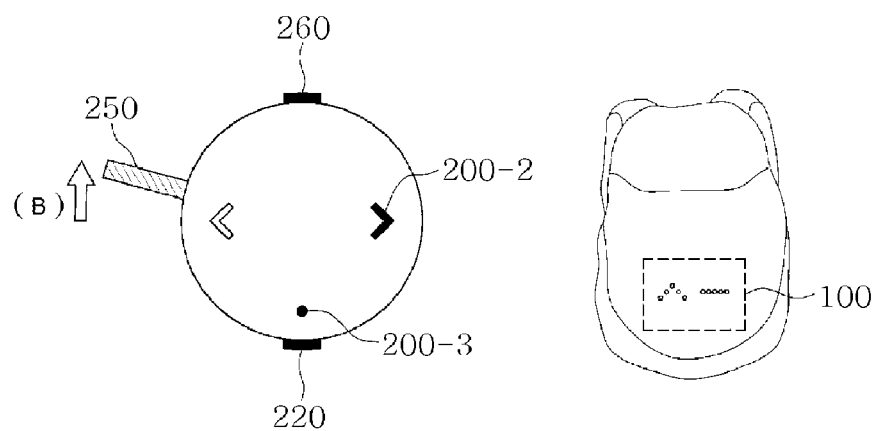
Figure 16:
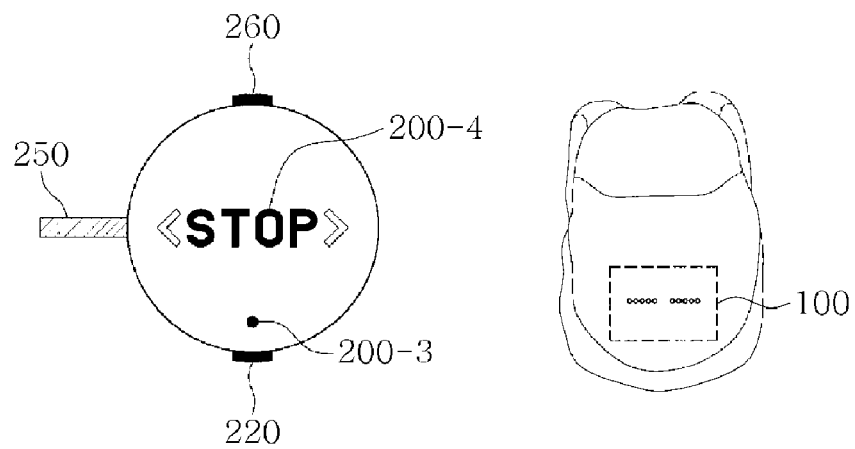
Figure 17:
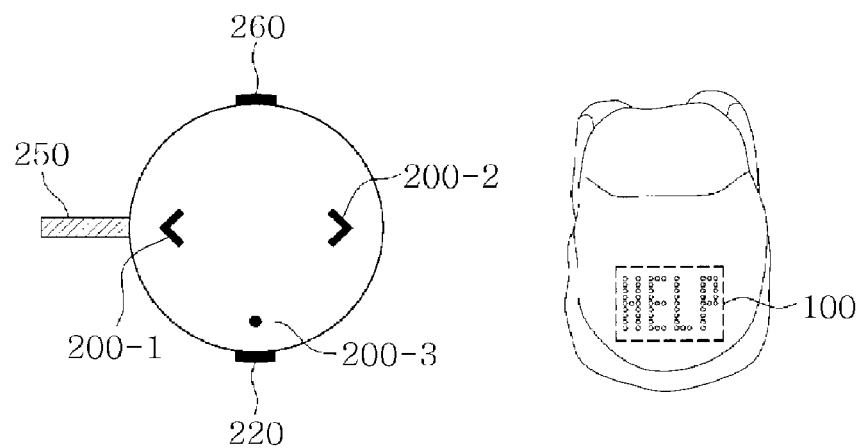

For example, the first display unit 100 may display various emoticons. During riding, the first display unit 100 may display an emoticon corresponding to a smile, as shown in FIG. 13. When a bicycle moves to the left, the first display unit 100 may display an emoticon corresponding to a wink that the left eye looks like shutting, as shown in FIG. 14. When a bicycle moves to the right, the first display unit 100 may display an emoticon corresponding to a wink that the right eye looks like shutting, as shown in FIG. 15. When a bicycle stops, the first display unit 100 may display an emoticon corresponding to that both eyes look like shutting, as shown in FIG. 16. In an emergency, the first display unit 100 may display text 'HELP' indicating help, as shown in FIG. 17. In addition, various emoticons, text, or symbols may be set.

Figure 18:
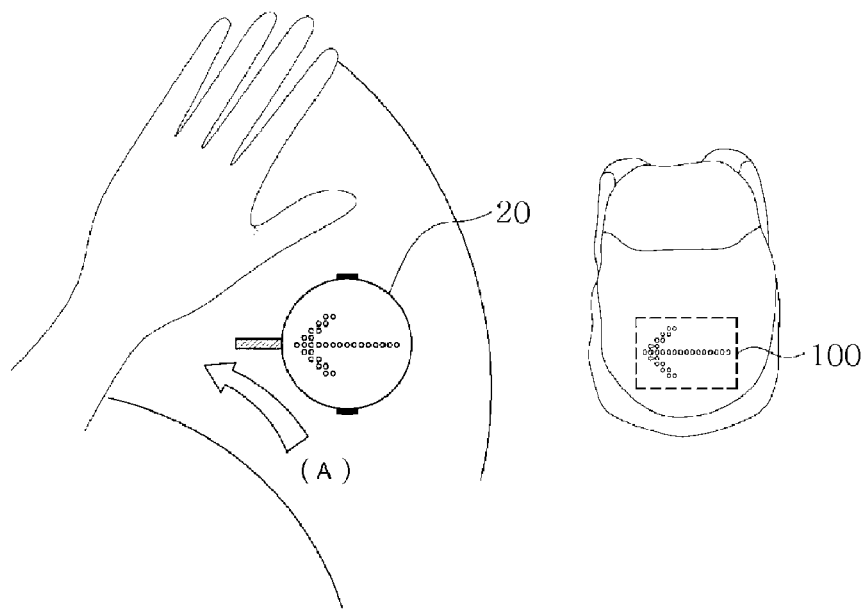
FIGS. 18 to 20 are operational diagrams showing the operations of a sensing mode according to the first embodiment of the present invention.
Figure 19:
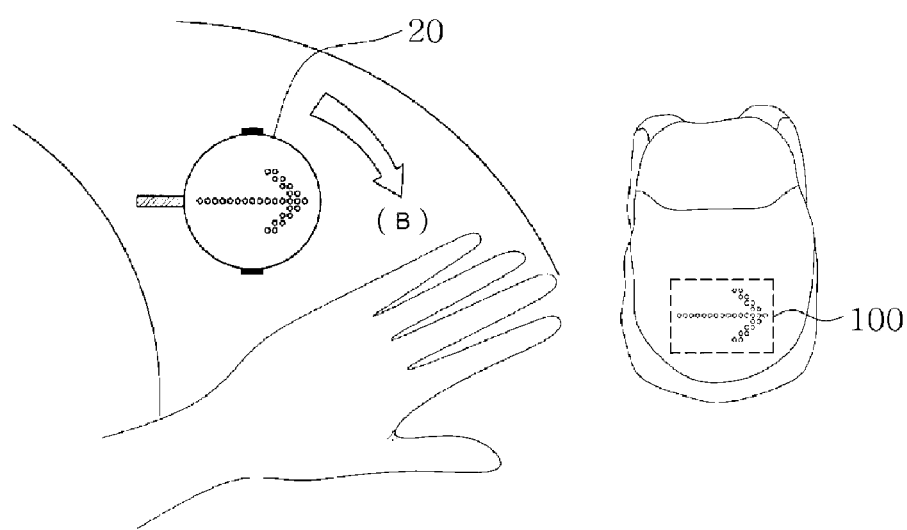
Figure 20:
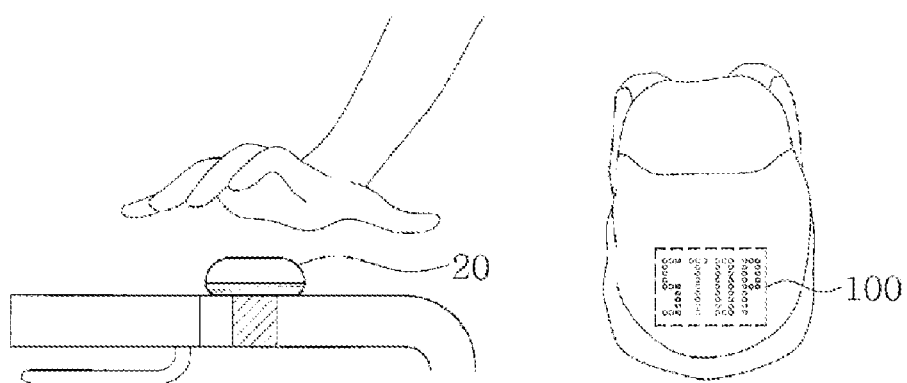

FIGS. 18 to 20 are diagrams illustrating the operations of the sensing mode according to the first embodiment of the present invention. It is preferred that the second sensor 240 of the remocon 20 include a behavior sensor.

Referring to FIG. 18, when a user wants to move a bicycle in a left direction and to display the left direction display in the indicating display device 10, the user moves his hand in a direction (A) (i.e., from the left direction to the right direction) over the remocon 20. In response thereto, when the second sensor 240 senses the motion and informs the second control unit 210 of the motion, the second control unit 210 controls the second display unit 200 such that the second display unit 200 displays the left direction arrow, and the first control unit 110 controls the first display unit 100 such that the first display unit 100 displays the left direction arrow through wireless communication between the remocon 20 and the indicating display device 10.

Referring to FIG. 19, when a user wants to move a bicycle in a right direction and to display the right direction display in the indicating display device 10, the user moves his hand in a direction (B) (i.e., from the right direction to the left direction) over the remocon 20. In response thereto, when the second sensor 240 senses the motion and informs the second control unit 210 of the motion, the second control unit 210 controls the second display unit 200 such that the second display unit 200 displays the right direction arrow, and the first control unit 110 controls the first display unit 100 such that the first display unit 100 displays the right direction arrow through wireless communication between the remocon 20 and the indicating display device 10.

Referring to FIG. 20, when a user wants to stop a bicycle and to display STOP in the indicating display device 10, the user pauses his hand over the remocon 20 for a specific period of time. In response thereto, when the second sensor 240 senses the pause and informs the second control unit 210 of the pause, the second control unit 210 controls the second display unit 200 such that the second display unit 200 displays STOP, and the first control unit 110 controls the first display unit 100 so that the first display unit 100 displays STOP through wireless communication between the remocon 20 and the indicating display device 10.

Figure 21:
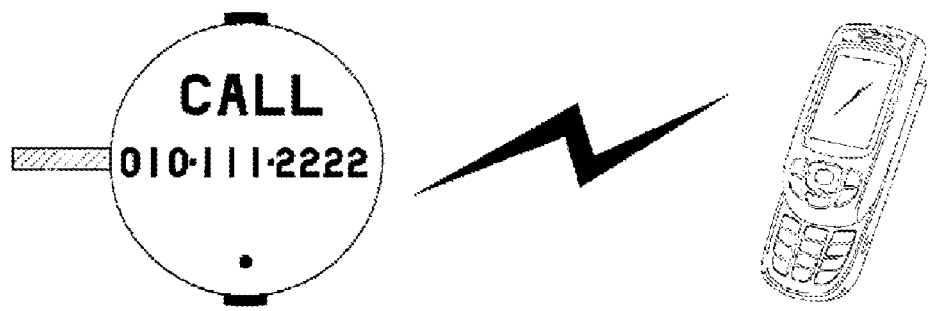
FIG. 21 is an exemplary diagram showing another embodiment of a remocon according to the first embodiment of the present invention.

FIG. 21 is an exemplary diagram illustrating another embodiment of a remocon according to the first embodiment of the present invention.

If the remocon 20 according to the present invention is connected to an external mobile phone over a network, when a call is received by the mobile phone, the second display unit 200 of the remocon 20 may display CALL indicating that a call has been received and the telephone number of a counterpart. Here, the external mobile phone may be configured to transmit call information and its own number to the remocon 20 by using a wireless protocol, such as ZigBee or Bluetooth. Accordingly, the remocon 20 may display received information (i.e., the telephone number of a counterpart) through a wireless interface with the external mobile phone, as shown in FIG. 21.

The first and the second display units 100 and 200 of the present invention may display various emoticons, text, and symbols. It is preferred that the light-emitting diodes forming each of the first and the second display units 100 and 200 be configured to have arrangements in which various emoticons, text, and symbols can be displayed. It is to be noted that various shapes may be displayed by a combination of the light-emitting states of the light-emitting diode array.

A second embodiment of the present invention is described in detail below with reference to FIGS. 22 to 33.

A remocon 20 has a predetermined shape and includes an interface 150, a processing unit 160, and a transceiver unit 170. The interface 150 includes a power button 151, a direction mark unit 152, and a stop mark unit 153 which are formed on the surface and sides of the remocon 20. The transceiver unit 170 is embedded in the remocon 20 and is configured to perform wireless transmission and reception to and from the indicating display device 10. The processing unit 160 controls the operations of the interface 150 and the transceiver unit 170.

The power button 151 is laterally protruded. When the power button 151 is pressed, power is supplied to the remocon 20.

The power button 151 is configured to be raised upwardly or lowered downwardly in the state in which power is supplied. When the power button 151 is raised upwardly, the indicating display device 10 may display a right turn. When the power button 151 is lowered downwardly, the indicating display device 10 may display a left turn.

Furthermore, the power button 151 may be configured to be rotated to the left or right. When the power button 151 is rotated to the left, the automatic mode may be set. When the power button 151 is rotated to the right, the manual mode may be set. Here, the automatic mode or the manual mode may be set by another element other than the power button 151. Here, the manual mode refers to movement by a user, and the automatic mode refers to manipulation according to the sensing of the tilt sensor 335 within the indicating display device 10.

The direction mark unit 152 is adjacent to the power button 151 and is formed on the surface of the remocon 20. For example, an arrow directing toward the upper direction may be set to display a right turn, and an arrow directing toward the lower direction may be set to display a left turn.

The direction mark unit 152 may emit light when a user controls the power button 151 in the manual mode and may automatically emit light according to the sensing of the tilt sensor 335 in the automatic mode.

The stop mark unit 153 may be placed in the central region of a top surface of the remocon 20. When a user presses the stop mark unit 153 in the manual mode, the stop mark unit 153 may emit light. The stop mark unit 153 may emit light according to the sensing of the tilt sensor 335 in the automatic mode.

Meanwhile, the interface 150 of the remocon 20 may further include another emergency button (not shown) on its surface. When a user is in an emergency situation, the user may manipulate the emergency button of the remocon 20 such that the indicating display device 10 emits light in order to inform the current situation externally.

Meanwhile, the transceiver unit 170 may be embedded in the remocon 20, and it plays a role of a modem that performs wireless communication with the indicating display device 10.

The processing unit 160 is embedded in the remocon 20, and it receives a signal, corresponding to the automatic mode or the manual mode, from the interface 150 and controls the operation of the transceiver unit 170 or the interface 150 according to each mode.

Figure 22:
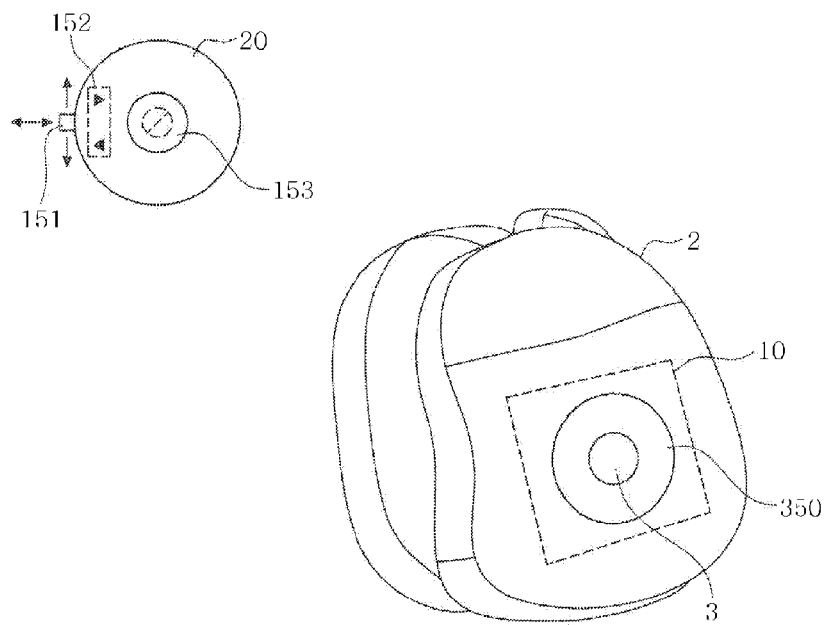
FIG. 22 is an exemplary diagram according to a second embodiment of the present invention.
Figure 23:
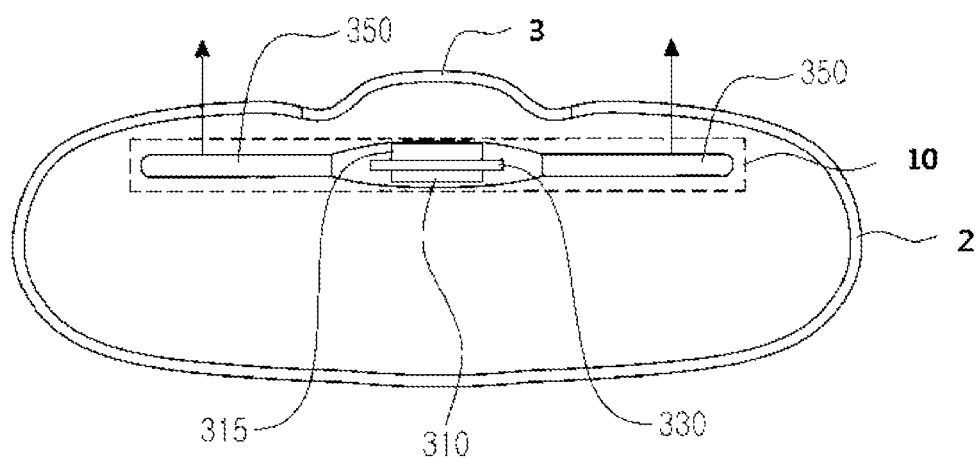
FIG. 23 is a cross-sectional view according to the second embodiment of the present invention.
Figure 24:
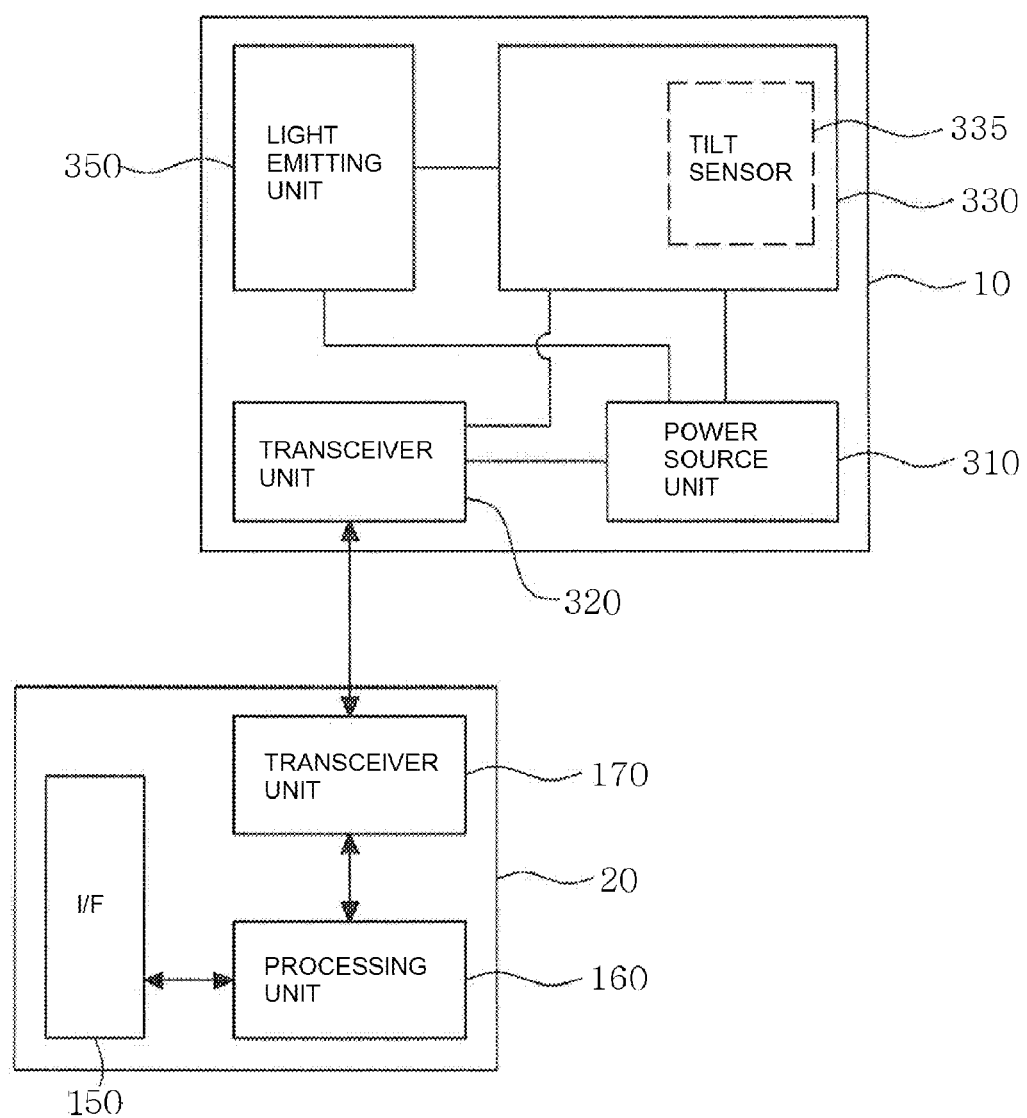
FIG. 24 is a block diagram according to the second embodiment of the present invention.

The indicating display device 10 includes a light-emitting unit 350, a power source unit 310, and a processing unit 330, as shown in FIGS. 22 to 24.

The light-emitting unit 350 of the indicating display device 10 may be formed to have a doughnut shape.

The light-emitting unit 350 includes a plurality of light-emitting diodes forming the doughnut shape. The light-emitting diodes may be configured as shown in FIGS. 25 to 29.

That is, referring to FIGS. 25 to 29, the light-emitting unit 350 according to an embodiment of the present invention includes a plurality of light-emitting diodes arranged in a circle and a plurality of light-emitting diodes arranged in a diamond shape within the circle.

The light-emitting diodes may be individually driven and configured to display a special shape.

Figure 25:
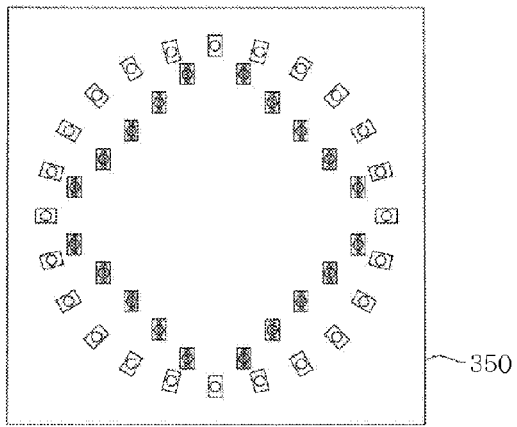
FIGS. 25 to 29 are operational diagrams showing examples in which a light-emitting unit emits light according to the second embodiment of the present invention.

In order to display during-riding as shown in FIG. 25, the light-emitting diodes forming the external circle may emit light.

Figure 26:
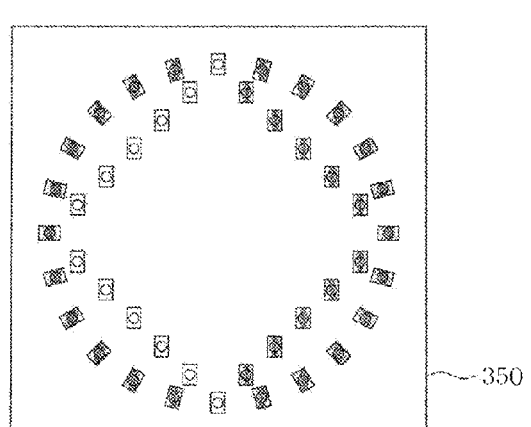
Figure 27:
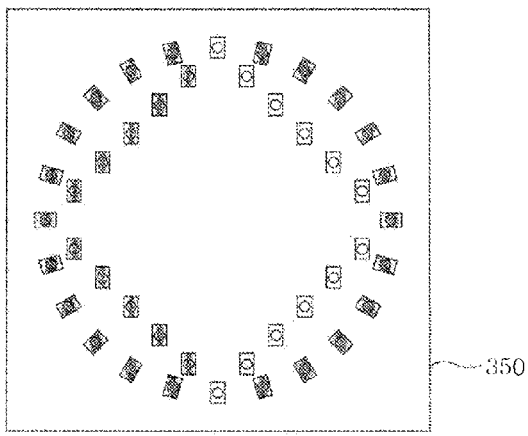

Furthermore, in order to display a left turn as shown in FIG. 26, the light-emitting diodes on the left side of the diamond shape may emit light. In order to display a right turn as shown in FIG. 27, the light-emitting diodes on the right side of the diamond shape may emit light.

Figure 28:
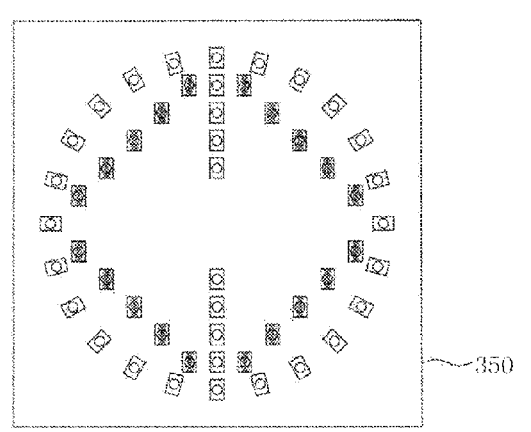
Figure 29:
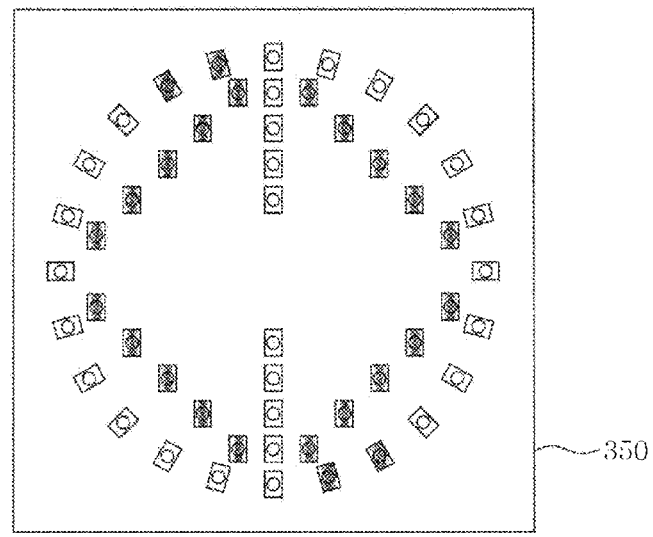

If the light-emitting unit 350 includes column light-emitting diodes at the center crossing the circle and the diamond shape as shown in FIGS. 28 and 29, the light-emitting diodes of the external circle and the column light-emitting diodes may emit light in order to display a stop as shown in FIG. 28. In order to display SOS indicating an emergency situation, light-emitted diodes forming an S shape of FIG. 29, the light-emitted diodes forming the external circle, and the light-emitted diodes forming the S shape of FIG. 29 may continuously emit light.

As shown in FIG. 23, the power source unit 310 and the processing unit 330 are formed in the central region of the light-emitting unit 350. A battery forming the power source unit 310 may be formed under a printed circuit board (not shown) where chips including the processing unit 330 are placed.

Meanwhile, a piezoelectric element 315 for transferring a signal according to a change of external pressure may be formed over the processing unit 330. The processing unit 330 receives an electrical signal from the piezoelectric element 315 and supplies power to the indicating display device 10.

A chip forming the transceiver unit 320 may be formed on the printed circuit board.

Furthermore, the processing unit 330 may transfer the power of the power source unit 310 to each of the elements and control the light-emitting unit 350 in response to a signal received from the transceiver unit 320. Furthermore, the tilt sensor 335 may be included within the processing unit 330. In the automatic mode, the light-emitting unit 350 may be automatically operated according to the sensing of the tilt sensor 335.

The indicating display device 10 may be integrated with and formed in a portable backpack 2 that can be worn as shown in FIGS. 22 and 23.

That is, the indicating display device 10 may be attached to the surface of the inside of the portable backpack 2 as shown in FIG. 22. The portable backpack 2 and the indicating display device 10 may be easily combined using known coupling technology, such as a Velcro tape and reception.

Here, a power switch region 3 made of elastic substance, such as rubber, is formed on the front of the portable backpack 2. It is preferred that the power switch region 3 be arranged and formed in a position where the piezoelectric element 315 is placed. In this structure, when the power switch region 3 is externally pressed, the indicating display device 10 is configured to apply pressure to the piezoelectric element 315.

Figure 30:
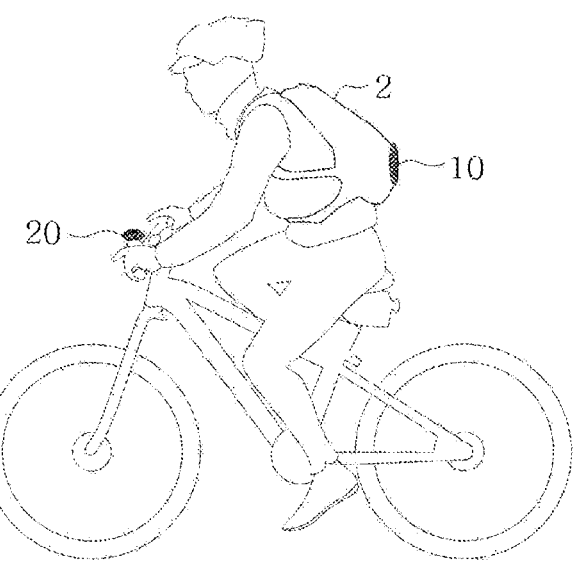
FIGS. 30 and 31 show a use state according to the second embodiment of the present invention.
Figure 31:
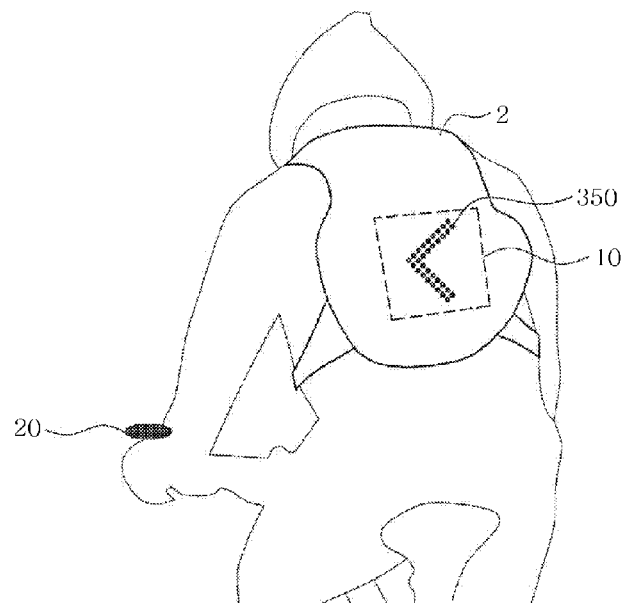

When a user rides on a bicycle, etc. as shown in FIGS. 30 and 31, the remocon 20 may be fit into the region of a bicycle handle. The indicating display device 10 may be used when a user wears the portable backpack 2 of FIG. 22.

The operation of the indicating display device 10 according to the present invention is described below. When a user presses the power button 151 of the remocon 20 and the power switch region 3 of the backpack 2, power is supplied to the remocon 20 and the indicating display device 10.

If a user sets the manual mode by rotating the power button 151 of the remocon 20 to the left or right, the user may display the right turn or the left turn by moving the power button 151 upwardly or downwardly and display STOP by pressing the stop mark unit 153.

In response to the manipulation of the power button 151 by the user, the processing unit 160 of the remocon 20 generates a control signal and sends the control signal to the indicating display device 10 through the transceiver unit 170.

The processing unit 330 of the indicating display device 10 receives the control signal of the remocon 20 and turns on the light-emitting unit 350 such that various shapes shown in FIGS. 25 to 29 are displayed.

When a control signal is not received, the processing unit 330 may perform control such that during-riding is emitted.

Furthermore, when a user presses the emergency button of the remocon 20, the processing unit 330 may receive a relevant control signal and control the light-emitting unit 350 such that SOS is displayed in the light-emitting unit 350.

When a user sets the automatic mode, the processing unit 330 of the indicating display device 10 actuates the tilt sensor 335.

The processing unit 330 controls the emission of the light-emitting unit 350 according to a result of the determination of a signal sensed by the tilt sensor 335 and controls the emission of the light-emitting unit 350 while transmitting a signal according to a result of the determination of the remocon 20.

Meanwhile, unlike in the previous embodiment, the tilt sensor 335 may measure a degree that the body of a user is inclined left or right against the front. The processing unit 330 may determine the left turn or the right turn based on a value measured by the tilt sensor 335 and may control the emission of the light-emitting unit 350 according to the determination. Furthermore, the emission of the direction mark unit 152 may be controlled when a signal according to the result of the determination is transmitted to the remocon 20.

As described above, an operation in the automatic mode or the manual mode is possible according to an intension of a user, and control is simple and convenient because the remocon 20 and the indicating display device 10 perform wireless communication.

Furthermore, the indicating display device 10 is configured to be attached to the back of a user, such as the portable backpack 2. Accordingly, an accident can be prevented because the route of a user can be predicted in the rear of the user.

Figure 32:
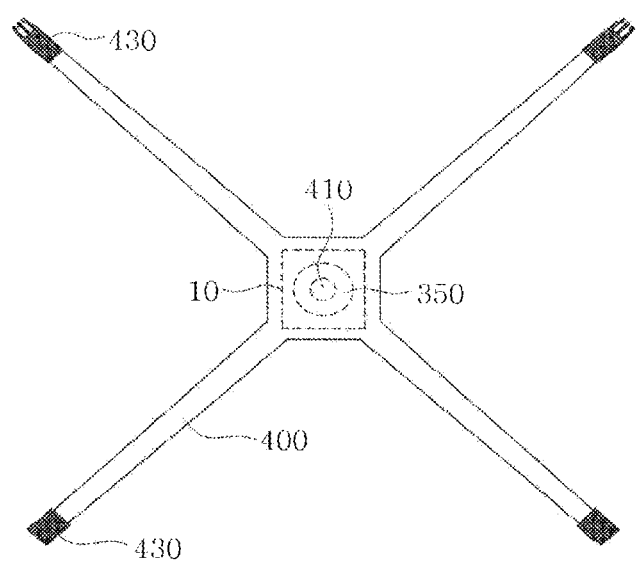
FIGS. 32 and 33 are an exemplary diagram and a use state showing another embodiment of an indicating display device according to the second embodiment of the present invention.
Figure 33:
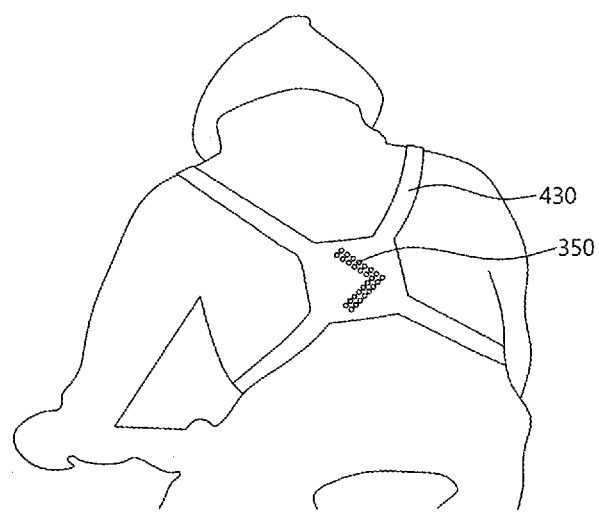

FIGS. 32 and 33 show the indicating display device 10 according to another embodiment of the present invention.

The indicating display device 10 according to another embodiment of the present invention is configured to have a band 400 not the portable backpack 2, unlike in FIG. 22.

More specifically, the indicating display device 10 includes the light-emitting unit 350 as in shown FIG. 22, a power switch region 410 aligned with the piezoelectric element 315 of the indicating display device 10 and formed in the central region of the band 400, and four branches extended in an x shape around the light-emitting unit 350.

The four branches are fit into the respective end portions 430 of the upward and downwardly branches, thus forming the band 400, such as the back of a user as shown in FIG. 33. Constructions associated with the remocon 20 and the operations of the automatic and manual modes are the same as those described above.

Furthermore, a third embodiment of the present invention is described in detail below with reference to FIG. 34.

Figure 34:
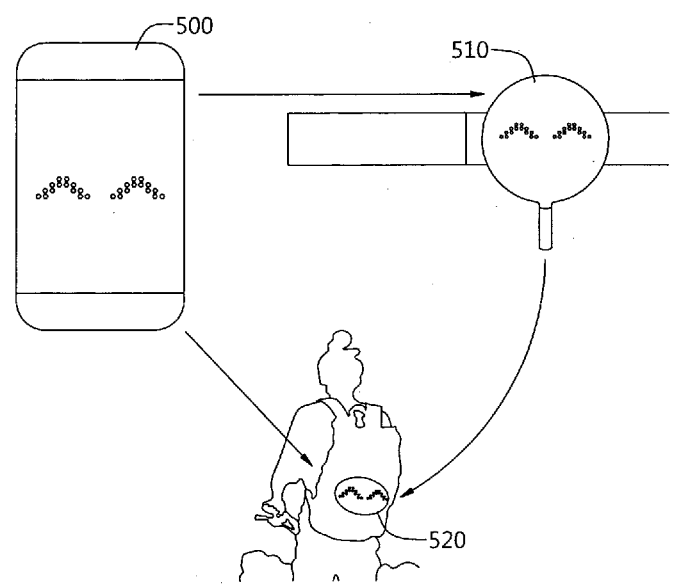
FIG. 34 shows a use state showing a third embodiment of the present invention.

Referring to FIG. 34, the third embodiment according to the present invention includes a mobile terminal 500 configured to have an application program capable of managing emoticons, text, and symbols installed therein and to have a wireless communication function and a remocon 510 and an indicating display device 520 configured to be capable of communicating with the mobile terminal 500.

The application program installed in the mobile terminal 500 may generate and store emoticons, text, and symbols and may download and store emoticons, text, and symbols from the outside through wireless communication. Furthermore, the application program has a function of transmitting the stored emoticons, text, and symbols through wireless communication.

The mobile terminal 500 is configured to have application programs installed therein, and it collectively refers to a portable terminal that enables data wireless communication. For example, the mobile terminal 500 may include a mobile phone, an intelligent terminal, or a smart phone.

Meanwhile, a remocon and an indicating display device, such as those disclosed in the first embodiment or the second embodiment, may be used as the remocon 510 and the indicating display device 520.

In the third embodiment configured as described above, a user may generate or download emoticons, text, or symbols by using the mobile terminal 500, store the generated or downloaded emoticons, text, or symbols, select one of the stored emoticons, text, or symbols, and wirelessly transmits the selected emoticons, text, or symbols to the remocon 510 and the indicating display device 520. The remocon 510 and the indicating display device 520 display the emoticons, text, or symbols received from the mobile terminal 500. If the selected emoticons, text, or symbols to the remocon 510, the remocon 510 may resend the received emoticons, text, or symbols to the indicating display device 520.

Furthermore, as described in connection with the first embodiment or the second embodiment, the indicating display device 520 may display the emoticons, text, or symbols received from the mobile terminal 500 when the automatic mode using the sensor or the manual mode according to the manipulation of the remocon 510 is selected.

Furthermore, the indicating display device 520 may be configured to be fixed to or detachable from a product (e.g., backpack) that may be worn by a use and may be formed of a flexible Printed Circuit Board (PCB) Light-Emitting Diodes (LEDs) display.

Furthermore, wireless communication between the mobile terminal 500 and the remocon 510 or the indicating display device 520 may be implemented by using various wireless communication protocols including ZigBee or Bluetooth. An interface between the remocon 510 and the indicating display device 520 may also be implemented using various wireless communication protocols.

Since the third embodiment is configured as described above, a user may collect emoticons, text, or symbols using the mobile terminal 500 over a mobile network, edit the collected emoticons, text, or symbols, or generate the emoticons, text, or symbols and display the emoticons, text, or symbols through the indicating display device 520. Accordingly, there is an advantage in that a feeling of use can be improved.

Furthermore, in the embodiments according to the present invention, the construction corresponding to a bicycle has been illustrated, but not limited thereto. The indicating display device 520 may be configured in backpacks for reports, the band, etc. and the remocon 510 may be configured so that the remocon 510 can be put on a wrist. Accordingly, the indicating display device 520 and the remocon 510 may be used in various uses. It is evident that detailed drawings of the applications can be readily deduced from the embodiments.

As described above, in accordance with the present invention implemented using the above means, the direction indicating lamp can be easily carried during bicycle riding or leisure sports, and a user can inform adjacent persons or vehicles of his state or movement information using a remocon or a mobile terminal that enable wireless communication. Accordingly, there is an advantage in that the safety of a user can be provided.

Furthermore, in accordance with the present invention, a user can express his state, including a change of emotion or a behavior, using emoticons or text through the remocon and the direction indicating lamp. Accordingly, there is an advantage in that a user may have additional enjoy during bicycle riding or leisure sports.

What is claimed is:

1. A portable information display apparatus, comprising:
an indicating display device, comprising a first display unit capable of displaying one or more of emoticons, text, and symbols, a first sensor including a tilt sensor, a first transceiver unit for wireless communication, and a first control unit configured to receive a mode signal through the first transceiver unit, to have critical values for performing an automatic mode set therein, and to control a selective display of the emoticons, the text, and the symbols in the first display unit, the indicating display device being mounted on a product that is wearable by a user; and
a remote controller, comprising a second transceiver unit for the wireless communication, a mode selection unit capable of selecting the automatic mode, and a second control unit for controlling the mode signal provided when the mode selection unit selects the automatic mode so that the mode signal is transmitted to the first transceiver unit through the second transceiver unit,
wherein when the mode signal corresponding to the automatic mode is transmitted from the remote controller to the indicating display device, the first control unit compares a sensing signal of the first sensor, obtained by sensing a tilt according to a motion of a user, with the critical values and performs the selective display of the emoticons, the text, and the symbols according to a result of the comparison.

2. The portable information display apparatus as claimed in claim 1, wherein the first control unit performs the selective display of the emoticons, the text, and the symbols for a during-riding, a stop, a left direction, and a right direction in response to the sensing signal of the first sensor.

3. The portable information display apparatus as claimed in claim 1, wherein the first control unit compares a sensing signal according to a degree that the first sensor is inclined forward or inclined left or right with the critical values and performs the selective display of the emoticons, the text, and the symbols for a during-riding, a stop, a left direction, and a right direction.

4. A portable information display apparatus, comprising:
an indicating display device, comprising a first display unit capable of displaying one or more of emoticons, text, and symbols, a first sensor including a tilt sensor, a first transceiver unit for wireless communication, and a first control unit for receiving a mode signal through the first transceiver unit and for controlling a selective display of the emoticons, the text, and the symbols in the first display unit in response to an emotion mode, the indicating display device being mounted on a product that is wearable by a user,
wherein the first control unit controls the emoticons, the text, and the symbols such that the emoticons, the text, and the symbols are selectively displayed in the first display unit in response to a sensing signal of the first sensor according to a motion of a user in the emotion mode set by the mode signal.

5. A portable information display apparatus, comprising:
an indicating display device, comprising a first display unit capable of displaying one or more of emoticons, text, and symbols, a first transceiver unit for wireless communication, and a first control unit for receiving a mode signal through the first transceiver unit and for controlling a selective display of the emoticons, the text, and the symbols in the first display unit in response to at least one of a sensing mode, a manual mode and an emoticon mode, the indicating display device being mounted on a product that is wearable by a user; and
a remote controller, comprising:
a second display unit for displaying a manipulation state;
a second transceiver unit for the wireless communication;
a mode selection unit capable of selecting at least one of the sensing mode, the manual mode according to a manipulation of a user and the emoticon mode according to a manipulation of a user;
at least one of a second sensor for sensing a hand movement of a user, a direction indication unit manipulated by the user, and a button for enabling the user to select emotion; and
a second control unit for transmitting the mode signal of the mode selection unit and a control signal to the first transceiver unit through the second transceiver unit and for controlling a display state of the second display unit, wherein the control signal is at least one of a control signal corresponding to a sensing signal of the second sensor, a control signal of the direction indication unit, and a control signal of the button;
wherein when the mode signal corresponding to the sensing mode is transmitted from the remote controller to the indicating display device, the first control unit performs the selective display of the emoticons, the text, and the symbols corresponding to at least one of the hand movement of the user, the control signal of the direction indication unit, and the control signal of the direction indication unit.

6. The portable information display apparatus as claimed in claim 5, wherein the remote controller includes the second sensor:
the second sensor senses an action of the hand corresponding to a stop display indicating a stop state of the hand, a right direction arrow indicating the hand movement from a left to a right, or a left direction arrow indicating the hand movement from the right to the left and provides the sensing signal corresponding to the sensed action, and
the first and the second display units are controlled for the selective display corresponding to the provided signal.

7. The portable information display apparatus of claim 5, wherein the mode selection unit is capable of selecting the manual mode according to manipulation of a user, the remote controller includes the direction indication unit manipulated by the user, and the control signal is the control signal of the direction indication unit; and
when the mode signal corresponding to the manual mode is transmitted from the remote controller to the indicating display device, the first control unit performs the selective display of the emoticons, the text, and the symbols corresponding to the control signal of the direction indication unit.

8. The portable information display apparatus as claimed in claim 7, wherein:
the direction indication unit provides the control signal corresponding to a stop, a left direction, or a right direction, and
the first and the second display units are controlled for the selective display corresponding to the provided signal.

9. The portable information display apparatus as claimed in claim 7, wherein:
the remote controller further comprises an emergency light button, and
the second display unit is controlled for a display of an emergency signal according to a manipulation of the emergency light button.

10. The portable information display apparatus of claim 5, wherein the mode selection unit is capable of selecting the emotion mode according to the manipulation of a user, the remote controller includes the button for enabling the user to select emotion, and the control signal is the control signal of the button to the first transceiver unit; and
when the mode signal corresponding to the emotion mode is transmitted from the remote controller to the indicating display device, the first control unit performs a selective display of the emoticons, the text, and the symbols corresponding to the control signal of the direction indication unit.

11. The portable information display apparatus as claimed in claim 10, wherein the indicating display device performs the display, including the emotions including a smile display, a wink display, and a display indicating that both eyes are shut, and text including a help display in response to the control signal of the button.

12. The portable information display apparatus of claim 5, wherein the mode selection unit is capable of selecting the sensing mode, the remote controller includes the second sensor for sensing the hand movement of the user, and the control signal is the control signal corresponding to a sensing signal of the second sensor; and
when the mode signal corresponding to the manual mode is transmitted from the remote controller to the indicating display device, the first control unit performs the selective display of the emoticons, the text, and the symbols corresponding to the control signal of the direction indication unit.

13. A portable information display apparatus, comprising:
a remote controller comprising a second display unit for displaying emoticons, text, or symbols, a second transceiver unit for wireless communication, and a second control unit for performing control so that a mobile phone number of a counterpart received through the second transceiver unit is displayed in the second display unit; and
a mobile phone configured to perform wireless communication with the second transceiver unit and to transmit the mobile phone number of the counterpart.

14. A portable information display apparatus, comprising:
a remote controller, comprising a power button for selecting a supply of power when the power button is pressed and for selecting a right turn and a left turn when the power button is moved up and down, a direction mark unit for emitting light in response to the right turn and the left turn, a stop mark unit for selecting a stop display when the stop mark unit is pressed, a transceiver unit for wirelessly transmitting and receiving signals according to operations of the power button and the stop mark unit, and a first processing unit for controlling the transceiver unit when an automatic mode or a manual mode is set according to a manipulation of the power button; and
an indicating display device, comprising a light-emitting unit formed of a plurality of light-emitting diodes and formed to have a doughnut shape and a second processing unit formed in a central region of the light-emitting unit and configured to control an emission of the light-emitting unit through wireless transmission and reception to and from the remote controller,
wherein the indicating display device is mounted on any one of a portable backpack and a band that is worn.

15. The portable information display apparatus as claimed in claim 14, wherein:
the light-emitting unit comprises the plurality of light-emitting diodes, forming a circle, a diamond shape formed within the circle, and a column crossing the circle and the diamond shape, and
the plurality of light-emitting diodes individually emit light in response to a during-riding, a stop, a left turn, and a right turn.

16. The portable information display apparatus as claimed in claim 14, wherein:
when the indicating display device is set in the manual mode, the power button is movable upwardly and downwardly in order to display a right turn and a left turn, and
the second processing unit turns on the light-emitting unit according to a movement state of the power source from the remote controller.

17. The portable information display apparatus as claimed in claim 14, wherein the indicating display device further comprises a tilt sensor for an automatic mode, wherein the second processing unit turns on the light-emitting unit by determining a right turn, a left turn, a stop, and a during-riding according to a sensing of the tilt sensor.

18. A portable information display apparatus, comprising:
a mobile terminal configured to have an application program for generating emoticons, text, and symbols or externally downloading the emoticons, text, and symbols and storing the generated or downloaded emoticons, text, and symbols or wirelessly transmitting the stored emoticons, text, and symbols installed therein and to have a wireless communication function for the wireless transmission;
a remote controller configured to comprise a first display unit capable of displaying at least one of the emoticons, the text, and the symbols and to display the emoticons, the text, and the symbols, received from the mobile terminal, in a plurality of modes that can be set; and
an indicating display device configured to comprise a second display unit capable of displaying at least one of the emoticons, the text, and the symbols and to display the emoticons, the text, and the symbols, received from the mobile terminal, in a plurality of modes that can be set, and mounted on a product that is wearable by a user.

19. The portable information display apparatus as claimed in claim 18, wherein an acceleration sensor for displaying information, indicating a moving speed, in a form of the emoticons, the text, and the symbols according to the moving speed is embedded in the indicating display device.

* * * * *